G. R. WILLIAMS.
VEHICLE WHEEL.
APPLICATION FILED JAN. 25, 1913.
1,085,513.
Patented Jan. 27, 1914.
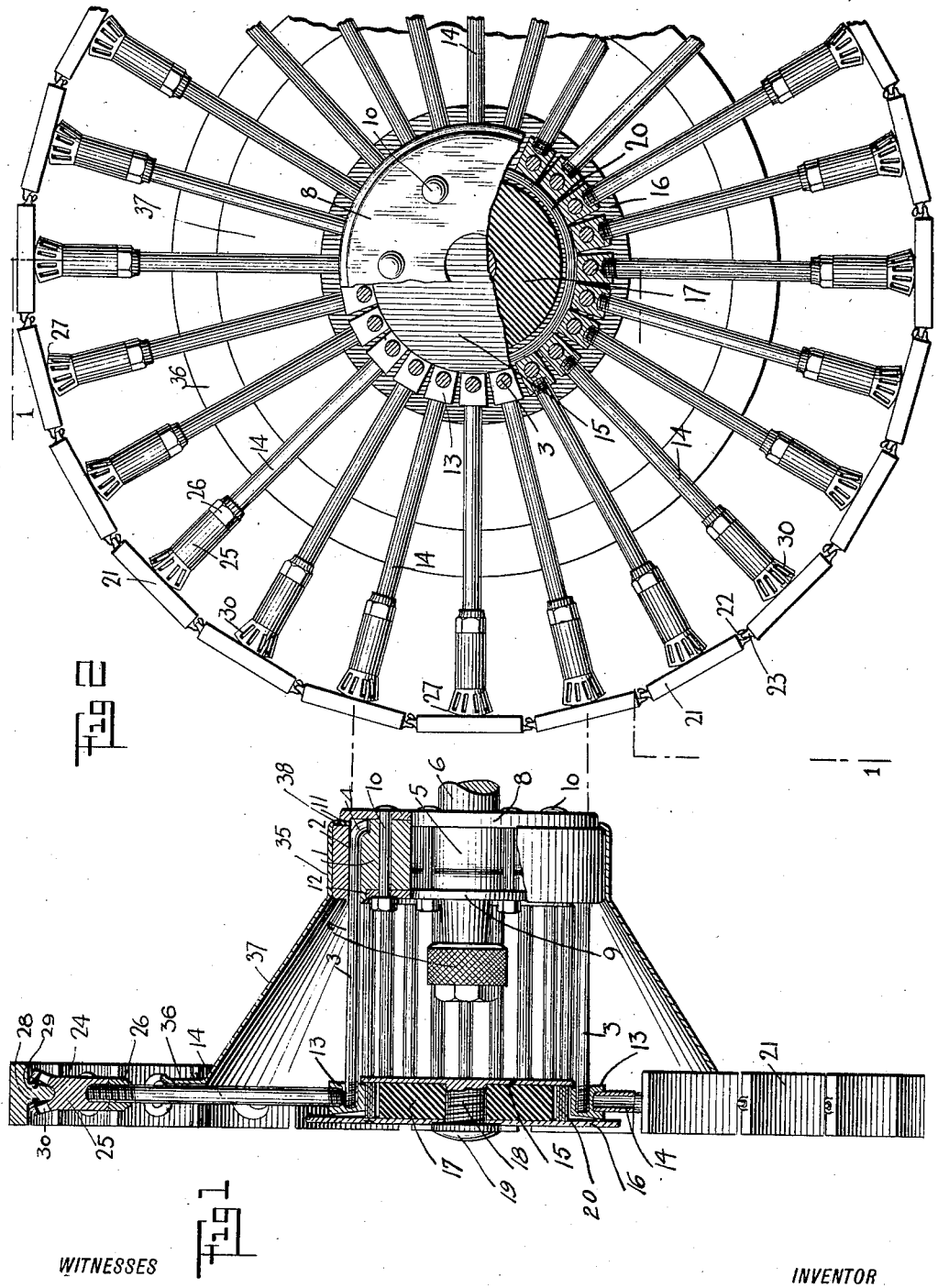
WITNESSES
C. J. Hachenberg
INVENTOR
GEORGE RAINEY WILLIAMS
BY
ATTORNEYS

UNITED STATES PATENT OFFICE.

GEORGE RAINEY WILLIAMS, OF LITTLE ROCK, ARKANSAS.

VEHICLE-WHEEL.

1,085,513.  Specification of Letters Patent.  Patented Jan. 27, 1914.

Application filed January 25, 1913. Serial No. 744,137.

*To all whom it may concern:*

Be it known that I, GEORGE RAINEY WILLIAMS, a citizen of the United States, and a resident of Little Rock, in the county of Pulaski and State of Arkansas, have invented a new and Improved Vehicle-Wheel, of which the following is a full, clear, and exact description.

This invention relates to resilient wheels, and the particular purpose of the invention is the provision of a new and improved structure presenting advantages over what is described and claimed in Letters Patent #921,493, issued to me May 11, 1909.

The principal object of the present invention is the provision of a new and improved vehicle wheel, characterized by an arrangement of parts in which the spokes of the wheel are in a condition of initial stress.

The wheel embodies a new and improved tire or tread, as well as improved means for mounting the different elements of the tire or tread at the outer ends of the spokes.

The wheel also embodies a new and improved means of construction, whereby the bearing blocks which carry the spokes coöperate with a central disk in order to provide for greater efficiency in the distribution of the load throughout the wheel.

Reference is to be had to the accompanying drawings forming a part of this specification, in which like characters of reference indicate corresponding parts in both views, and in which—

Figure 1 is a partial vertical sectional view of the wheel, on the line 1—1 of Fig. 2; while Fig. 2 is a side view, partly sectional, showing the hub construction.

The wheel is made up of a hub of substantially cylindrical construction, resilient in its nature, together with a number of spokes carried thereby, the tread being made up of a number of elements movably connected together and movably mounted on the outer ends of the spokes.

The hub involves a ring 1 of substantially annular construction, provided with a number of pockets 2 extending transversely thereof, into which the horizontal arms 3 of the spokes are entered; shown particularly in Fig. 1, the inner ends of these arms are slightly curved or bent as at 4, the said openings or pockets 2 being shaped to receive these bent ends. At the center of the said ring is a box or housing 5 into which the axle 6 enters, the outer end thereof being provided with a nut 7 for holding the wheel in position, the ends of the box or housing being provided with flanges 8—9 secured to opposite sides of the member 1 in any suitable manner, as by means of bolts 10. It will be noted that the peripheral portion of the flange 8 is upturned as at 11 in order to form a shoulder, whereby the bent or curved ends 4 of the arms 3 are securely maintained in position; it will be further noted that one side of the said member 1 is provided with a pocket 12 of a depth sufficient to receive the flange 9, the result being that a compact structure is set forth.

At the outer ends of the horizontal arms 3 are the bearing blocks 13, one being carried by each arm, the parts being held together in any desirable manner, as by screw-threaded engagement as shown, each block also receiving a vertical member 14 forming a spoke proper; each arm 3, then, and each vertical member 14 may be considered as collectively forming a spoke of right-angled construction.

The arms 3 are of substantially the same length, and the bearing blocks 13 are of substantially the same size and shape, being preferably of keystone or wedge formation. Coaxially with the axle 6 is a disk, preferably made up of spaced sides 15—16, with a core 17 between them; this core is preferably of material resilient or yielding in its nature. The diameter of the outer side member 16 is substantially greater than the diameter of the other side member 15, the parts being held together by means of a threaded extension 18 extending from the side 15 through the central portion 17, a nut 19 engaging the outer end of this extension.

It will be noted that the diameter of the central resilient or flexible portion 17 is such that a space is provided between the bearing blocks 13 and the said central portion, which space receives a spring member 20, preferably of spiral formation, which member, together with the central portion 17, forms a buffer, the spiral member additionally serving as a protection to the said central portion. The rim or tread of the wheel is made up of a number of substantially similar elements 21, having hooks 22 and eyes 23 carried thereby, one hook being adjacent one end of each member, and one eye adjacent the other end, the inter-engagement of all the hooks and eyes serving to maintain the shape of the said tread. The particular conformation of these elements which make up the tread is of little consequence, inasmuch as they may be either curved or flat, and may vary in their dimensions, the function obtainable, however, remaining the same. The under side of each tread element 21 is provided with a projection 24, preferably, though not essentially, conical in shape, and the outer end of each spoke section 14 is provided with a housing 25 adapted to receive the said projections; the housing may be retained in position on the spoke 14 in any suitable manner, preferably through threaded engagement therewith, the final relation of the parts being maintained by means of lock nuts 26. Referring particularly to Fig. 2, it will be noted that the outer end of each housing 25 is substantially curved, as at 27, the particular purpose being to provide a rocking motion of each tread element 21 about the end of each spoke 14. Within each housing 25, and extending substantially therearound, is a resilient member 28 which embraces the projection 24 entering the said housing. If so desired, the projection may be provided with a groove 29 extending therearound into which the said resilient member may engage. The outer end of each housing is also preferably provided with a number of openings 30, whereby jamming of the parts due to the entrance of sand or dirt is prevented, the said openings, while permitting the entrance of sand into the housing also permitting the escape thereof as the wheel travels over the ground.

When the horizontal arms 3 of the spokes are positioned in the bearing blocks with their ends held in the hub, such arms 3 are in a condition of stress, which is brought about in the following manner: When the vertical members 14 of the spokes are brought into engagement with the bearing blocks 13 and the housings 25, the tread elements 21 being then secured in position, the relation between the lengths of the vertical members 14 is such that the arms 3 are bent or stressed, the result being that such arms at all times exert an outward thrust against the inner ends of the spoke members 14. Such an arrangement provides for the elements of a wheel maintaining their proper positions relatively to each other in order that the circular conformation is retained; such an arrangement further provides that in use the wheel shall be easy riding, as any slight shocks are taken up by these arms 3 and are not communicated to the axle and body of the vehicle.

As a means of bracing the vertical members 14 of the spokes I make use of a cone-shaped brace, shown particularly in Fig. 1, which comprises the end portions 35—36 lying in planes at substantially right angles to each other, with the intermediate inclined portion 37. The peripheral portion of the end 35 is overturned as at 38, and is adapted to lie closely adjacent to and extend around the hub, being maintained in position closely adjacent the flange 8. The other end portion 36 lies closely adjacent the elements 14 of the spokes, bearing there-against, the said brace taking up the lateral thrust of the spokes in turning corners. The use of this brace, together with the initially stressed condition of the spokes, provides a wheel of substantial strength and especially adapted for the purposes for which it is intended.

In use the wheel is secured on the end of the axle, as illustrated; as the wheel turns the successive tread elements 21 come into engagement with the roadway, a freedom of movement being permitted each one of these elements, and the shocks incident to the travel being taken up by the center disk which acts as a buffer. The particular purpose of the wedge shape or keystone formation of the bearing blocks 13 permits them to come together and co-act in sustaining the load in a yielding manner when the vehicle is loaded. Under load or exceptional stress these said bearing blocks tend toward a common center, and adjacent ones will come together or press against each other, thereby giving added strength to each in yielding resistance as supporting spokes of the wheel. In addition, then, to merely acting as a connection between the horizontal spring arm of each spoke and the vertical arm of each spoke, each bearing block tends to support an adjacent one by reason of its shape when stress is applied to any particular vertical spoke member, the said bearing blocks under added stress finding support on the disk, as described.

It is obvious that the sizes of the various parts which make up the wheel may be changed in order to set forth a structure adapted to trucks or lighter vehicles, and also to set forth a resilient wheel adapted to different classes of roads.

Having thus described my invention, what I claim as new and desire to secure by Letters Patent is:—

1. A resilient wheel comprising a member made up of a number of connected elements, spokes in movable relation with the said elements, the said spokes comprising horizontally extending portions at their inner ends, means with which the inner ends of the spokes and the outer ends of the horizontally extending portions engage, and a resilient device adjacent the meeting ends of the spokes and the said horizontally extending portions.

2. A resilient wheel comprising a tread made up of a number of connected elements, spokes movably associated with the said elements, each spoke comprising a horizontally extending arm adjacent its inner end, a member to which the ends of the horizontally extending arms are connected, and a flanged element carrying a resilient member concentric with the tread and located adjacent the meeting points of the spokes and the horizontally extending arms.

3. A resilient wheel comprising a tread made up of a number of connected elements, spokes movably associated with the said elements, bearing blocks at the inner ends of the spokes, horizontally extending arms engaging the bearing blocks, a member to which the free ends of the horizontally extending arms are secured, and a flanged disk concentric with the tread and having a resilient member extending there-around lying adjacent to and adapted to be engaged by the said bearing blocks.

4. A resilient wheel comprising a tread made up of a number of pivotally connected elements, spokes movably associated with the elements, each spoke having a housing loosely receiving a portion of an element whereby the spoke and the element occupy a pivotal relation.

5. A resilient wheel comprising a number of elements connected together to form a tread, the said elements being movable with respect to each other, each element being provided on its under side with a projection, spokes associated with the said elements, the end of each spoke comprising a housing into which a projection extends, and a resilient device contained within the housing and engaging the projection, whereby each tread element may be moved pivotally with respect to the end of a spoke.

6. A resilient wheel comprising a number of similar elements connected together and movable with respect to each other, spokes movably associated with the said elements, the inner end of each spoke being provided with a bearing block having an arm extending horizontally therefrom, means for engaging the ends of the arms whereby they are supported, each bearing block being substantially of keystone shape, and a member concentric with the tread for receiving in movable relation the said bearing blocks.

7. A wheel comprising a tread made up of a number of separate elements connected together in movable relation, a number of spokes movably associated with the said elements, the inner end of each spoke being provided with a bearing block, an arm extending horizontally from each bearing block, means engaging the free ends of the arms, whereby the form of the wheel is maintained, the said arms being resilient in nature, and a resilient device concentric with the tread receiving the said bearing blocks, the bearing blocks being adapted to mutually support each other through engagement when a load is applied to the said wheel.

8. A wheel comprising a tread made up of a number of separate elements movably connected together, a hub, a number of spokes made up of elements extending at right angles to each other, whereby the hub lies to one side of the tread, the horizontally extending elements of the spokes being stressed after the parts of the said wheel are assembled, means for connecting the spoke elements and a buffer adjacent the portions of the spokes where the said right-angularly extending elements are connected.

In testimony whereof I have signed my name to this specification in the presence of two subscribing witnesses.

GEORGE RAINEY WILLIAMS.

Witnesses:
DONALD S. WHITE,
J. H. COUPER.

Copies of this patent may be obtained for five cents each, by addressing the "Commissioner of Patents, Washington, D. C."